(12) United States Patent
Naito et al.

(10) Patent No.: US 9,224,538 B2
(45) Date of Patent: Dec. 29, 2015

(54) SOLID ELECTROLYTIC CAPACITOR ELEMENT, METHOD FOR PRODUCING SAME, AND TOOL FOR PRODUCING SAID SOLID ELECTROLYTIC CAPACITOR ELEMENT

(75) Inventors: Kazumi Naito, Tokyo (JP); Masahiro Suzuki, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 454 days.

(21) Appl. No.: 13/824,603

(22) PCT Filed: Jul. 29, 2011

(86) PCT No.: PCT/JP2011/067401
§ 371 (c)(1),
(2), (4) Date: Mar. 18, 2013

(87) PCT Pub. No.: WO2012/035899
PCT Pub. Date: Mar. 22, 2012

(65) Prior Publication Data
US 2013/0182375 A1   Jul. 18, 2013

(30) Foreign Application Priority Data
Sep. 17, 2010   (JP) ................................. 2010-209656

(51) Int. Cl.
| | | |
|---|---|---|
| *H01G 9/00* | (2006.01) | |
| *H01G 9/028* | (2006.01) | |
| *H01G 9/15* | (2006.01) | |
| *H02M 3/06* | (2006.01) | |

(52) U.S. Cl.
CPC ............ *H01G 9/0029* (2013.01); *H01G 9/0036* (2013.01); *H01G 9/028* (2013.01); *H01G 9/15* (2013.01)

(58) Field of Classification Search
USPC ........................................................ 307/109
See application file for complete search history.

(56) References Cited

U.S. PATENT DOCUMENTS

| | | |
|---|---|---|
| 5,017,272 A | 5/1991 | Kamigawa et al. |
| 2009/0052118 A1 | 2/2009 | Naito et al. |
| 2012/0014036 A1 | 1/2012 | Naito et al. |

FOREIGN PATENT DOCUMENTS

| | | |
|---|---|---|
| JP | 2-298010 A | 12/1990 |
| JP | 3-22516 A | 1/1991 |
| JP | 05-159981 A | 6/1993 |
| JP | 2001-102256 A | 4/2001 |
| JP | 2005-244154 A | 9/2005 |
| WO | 2006/101167 A1 | 9/2006 |
| WO | 2010/107011 A1 | 9/2010 |

OTHER PUBLICATIONS

International Search Report of PCT/JP2011/067401, dated Nov. 1, 2011.

*Primary Examiner* — Robert Deberadinis
(74) *Attorney, Agent, or Firm* — Sughrue Mion, PLLC (57) ABSTRACT

A method of manufacturing a solid electrolytic capacitor element including the steps of forming a semiconductor layer on a dielectric layer formed on surfaces of a plurality of anode bodies at one time. A step of forming a semiconductor layer includes repeating an electrolytic polymerization operation several times by applying a current from a power-feeding terminal that comes into contact with each anode body. Further, at least one of the electrolytic polymerization operations continuously applies a current while changing the amount of current between the range of 5 to 200 μA per power-feeding terminal. Also disclosed is a jig for electrolytic polymerization for forming the semiconductor layer including a plurality of power supply circuits (i) capable of continuously changing the amount of current between a lower limit and an upper limit; and a power-feeding terminals (ii).

20 Claims, 3 Drawing Sheets

SOLID ELECTROLYTIC CAPACITOR ELEMENT, METHOD FOR PRODUCING SAME, AND TOOL FOR PRODUCING SAID SOLID ELECTROLYTIC CAPACITOR ELEMENT

CROSS REFERENCE TO RELATED APPLICATIONS

This is a National Stage of International Application No. PCT/JP2011/067401 filed Jul. 29, 2011, claiming priority based on Japanese Patent Application No. 2010-209656 filed Sep. 17, 2010, the contents of all of which are incorporated herein by reference in their entirety.

TECHNICAL FIELD

The present invention relates to a method of manufacturing a solid electrolytic capacitor element capable of attaining a stable capacitance appearance ratio, a jig for electrolytic polymerization to form a semiconductor layer of the solid electrolytic capacitor element, and a solid electrolytic capacitor element manufactured by using the manufacturing method or the jig.

BACKGROUND ART

A solid electrolytic capacitor is constituted by an electrical conductor (anode body) as one electrode, a dielectric layer formed on the surface layer of the electrode, and the other electrode (semiconductor layer) provided thereon. In the manufacture of a solid electrolytic capacitor comprising a semiconductor layer made of conductive polymer, forming of the dielectric layer on the anode body by chemical conversion and forming of the semiconductor layer thereon by electropolymerization are sequentially performed. Generally, a plurality of anode bodies are electrically connected in parallel, and such treatment as anodic oxidation (chemical conversion treatment) and electropolymerization (formation of a semiconductor layer) is carried out on the anode bodies at one time.

In the case of forming a semiconductor layer on a plurality of anode bodies, the following problem occurs because respective anode bodies are not always homogeneous and also the semiconductor formation rate may vary among the anode bodies. That is, the value of current flowing through each of the anode bodies cannot be constant, and in an extreme case, one anode body becomes defective (short-circuited state), and the current concentrates on the anode body while almost no current flows through the other anode bodies. In light of the above, the inventors of the present invention have proposed the method of forming a semiconductor layer by subjecting chemically-converted anode bodies to constant current electropolymerization by means of circuits including constant current sources (an internal jig for electrolytic polymerization) (Patent Document 1; JP 2005-244154 A (US 2007/101565 A1).

As a method for producing an electrolytic capacitor element which can obtain a group of capacitor elements having a narrow capacitance distribution and a low ESR by reducing the time for forming a dielectric layer (chemical conversion treatment), which requires time in the process for producing a capacitor, and by selecting an optimum amount of current depending on the stage of chemical conversion treatment and electropolymerization, the present inventors have filed a patent application relating to a method for manufacturing an electrolytic capacitor element including the steps of: forming a dielectric layer on surfaces of a plurality of anode bodies by anodic oxidation at one time; and forming a semiconductor layer on the dielectric layer, in which the anodic oxidation is performed by limiting a current for the anodic oxidation with respect to the individual anode bodies (Patent Document: 2 WO 2010/107011 (US 2012/014036 1)).

It is necessary in some cases to impart heat resistance to the dielectric layer by leaving a produced capacitor at a high temperature exceeding 200° C. after forming a dielectric layer, cooling it to room temperature, and subjecting it again to the chemical conversion treatment in order to improve the heat resistance of the produced capacitors (particularly, the stability of the leakage current (LC) value when the capacitor is subjected to a high-temperature treatment). Since the heat-proof temperature of the electronic parts to be mounted on the jig for electrolytic polymerization as disclosed by Patent Document 1 is generally 150° C. or lower, it is not possible to leave the jig to which conductors (such as a sintered body and a valve-acting metal foil) are joined at a high temperature exceeding 200° C. Therefore, it might be possible to prepare a jig to be left at a high temperature and a jig for internal electrolytic polymerization separately and to use the jigs by switching the conductors from one jig to another. However, it is very difficult to reconnect a number of conductors having a dielectric layer formed thereon to a jig with a proper connecting distance without damaging the formed dielectric layer, and is not practical.

JP-A-H02-298010 (Patent Document 3) discloses a method for electrolytic polymerization designed to connect a constant current element (constant current diode) to a stainless-steel electrode so as to bring the constant current diode into electric contact with the metal oxide layer (semiconductor layer) formed on the surface of an anode body. However, when one attempts to form a semiconductor layer by performing electrolytic polymerization with constant current within a practical period of time by this method and when the anode body is a sintered body having a high CV value, it is difficult to attain a high impregnation rate (80% or higher). Also, when the sintered body is large in volume (20 mm$^3$ or more), it is difficult to attain a high impregnation rate even if a sintered body has a low CV value. Meanwhile, performing electrolytic polymerization at a slow pace at a low constant current cannot be employed in the industrial production since it reduces the productivity.

Generally, it is expected that the capacitance change ratio of a solid electrolytic capacitor in the humidity resistance test is within ±20%. When the impregnation of a solid electrolytic capacitor is less than 80%, there is a possibility that 20% or more of the dielectric layer on which a semiconductor (cathode) is not attached exists inside the pores of the anode body. Depending on the environment in which the capacitor is placed, the part of the dielectric layer on which a semiconductor layer is not attached is subject to humidity and serves as a temporary cathode, which increases the capacitance. As a result, the capacitor fails to meet the standard in the humidity resistance test. Also, when moisture gains entry to the part of the dielectric layer on which a semiconductor layer is not attached in the pores of the anode body, it increases the likelihood of the deterioration of the dielectric layer caused by corrosion. For these reasons, it is desirable that the impregnation rate of the semiconductor layer is as high as possible.

CITATION LIST

Patent Document

Patent Document 1: JP-A-2005-244154
Patent Document 2: WO 2010/107011
Patent Document 3: JP-H02-298010

SUMMARY OF THE INVENTION

Problems to be Solved by the Invention

An object of the present invention is to provide a method for producing a solid electrolytic capacitor element, which enables a high impregnation rate at the time of forming a semiconductor layer at one time on the dielectric layer formed on a plurality of anode bodies by electrolytic polymerization even if the anode body has fine pores or is large in size as well as the production of a capacitor having high humidity resistance.

Means to Solve the Problem

As a result of intensive studies, the present inventors have found that a semiconductor layer can be formed at one time on multiple anode bodies with a high impregnation rate even if the multiple anode bodies have fine pores or the anode body is large in size and a group of capacitor elements having a narrow capacity distribution and a low ESR can be obtained by using a jig which can change the current value instantly to control the amount of current (reaction rate) during the electrolytic polymerization in the pores continuously at short intervals. That is, generally, in the formation of a semiconductor layer by electrolytic polymerization, the operation of electrolytic polymerization on the dielectric layer by passing a current from the outside and another operation (e.g. chemical conversion operation to repair the dielectric layer) are alternately repeated several times. It was confirmed that a semiconductor layer can be formed with a high impregnation rate when the current never stopped passing during one electrolytic polymerization operation so as to generate polymer (semiconductor) continuously; and that if a current stops passing even for a second during one electrolytic polymerization, it lowers the impregnation rate. Although the precise reason is not known, it is presumed that when the charge is not supplied to an active site for reaction while the polymerization proceeds inside the pores of an anode body, the polymerization at the site terminates and if a current is allowed to pass again, an active site for reaction will not be always formed in the same region and therefore it needs time to wait for polymerization (impregnation) to begin newly from outside the pore into the pore.

The present invention provides a method for producing a capacitor element, a capacitor element, and a jig for electrolytic polymerization to form a semiconductor layer of the electrolytic capacitor element as set forth below.

[1] A method of manufacturing a solid electrolytic capacitor element comprising the steps of forming a semiconductor layer on the dielectric layer formed on surfaces of a plurality of anode bodies at one time, wherein a step of forming a semiconductor layer comprises repeating an electrolytic polymerization operation several times by applying a current from a power-feeding terminal that comes into contact with each anode body, and at least one of the electrolytic polymerization operations continuously applies a current while changing the amount of current between the range of 5 to 200 µA per power-feeding terminal.

[2] The method of manufacturing a solid electrolytic capacitor element according to [1] above, in which applying a current while changing the amount of current is conducted by reducing a current from the upper limit to the lower limit and returning the current from the lower limit to the upper limit or by increasing a current from the lower limit to the upper limit and returning the current from the upper limit to the lower limit.

[3] The method of manufacturing a solid electrolytic capacitor element according to [2] above, in which the increase and decrease of the current between the upper and lower limits is conducted within a time range of from 30 seconds to 30 minutes.

[4] The method of manufacturing a solid electrolytic capacitor element according to any one of [1] to [3] above, in which a semiconductor layer not by electrolytic polymerization is formed on the surface of the dielectric layer of anode bodies prior to the formation of a semiconductor layer by electrolytic polymerization.

[5] The method of manufacturing a solid electrolytic capacitor element according to any one of [1] to [4] above, in which electrochemical polymerization for forming a semiconductor layer on a dielectric layer formed on a plurality of anode bodies is conducted by bringing the power-feeding terminal of a jig for electrolytic polymerization, comprising a plurality of power supply circuits (i) provided on an insulating substrate and capable of continuously changing the amount of current between a lower limit and an upper limit; and a power-feeding terminals (ii) electrically connected to the output of each of the plurality of power supply circuits, into contact with a plurality of anode bodies joined to an electroconductive support substrate.

[6] The method of manufacturing a solid electrolytic capacitor element according to any one of [1] to [5] above, comprising the anode body, which is a sintered body in which a CV value per volume excluding voids is 1,600,000 µF·V/cm³ or more.

[7] The method of manufacturing a solid electrolytic capacitor element according to any one of [1] to [5] above, comprising the anode body, which is a sintered body in which a CV value per volume excluding voids is 800,000 µF·V/cm³ or more and the volume is 20 mm³ or more.

[8] The method of manufacturing a solid electrolytic capacitor element according to any one of [1] to [7] above, in which a number of the plurality of anode bodies is equal to or larger than 300.

[9] A method of manufacturing a solid electrolytic capacitor, comprising manufacturing a capacitor element by the method described in any one of [1] to [8] above; electrically connecting an anode body of one or a plurality of the capacitor elements to an anode terminal and electrically connecting a semiconductor layer to a cathode terminal; and jacketing the capacitor elements with a resin thereafter.

[10] A solid electrolytic capacitor element group, comprising 300 or more electrolytic capacitor elements which are obtained by the method according to any one of [1] to [9] above, wherein the individual electrolytic capacitor elements each have a capacitance within a range from 90 to 110% of an average value of capacitances of the plurality of capacitor elements.

[11] A solid electrolytic capacitor group, comprising electrolytic capacitors each comprising one or a plurality of capacitor elements of the capacitor element group according to [10] above.

[12] A jig for electrolytic polymerization for forming a semiconductor layer on the dielectric layer formed on a surface of an anode body, comprising a plurality of power supply circuits (i) provided on an insulating substrate and capable of continuously changing the amount of current between a lower limit and an upper limit; and a power-feeding terminals (ii) electrically connected to the output of each of the plurality of power supply circuits to be placed in contact with anode bodies.

[13] The jig for electrolytic polymerization according to [12] above, in which a power-feeding terminal has a linear shape.

[14] The jig for electrolytic polymerization according to [12] or [13] above, in which, when an average value of the output currents of the power supply circuits is 5 to 200 µA, the output currents of the individual power supply circuits fall within a range of from 90% at minimum to 110% at maximum of the average value.

[15] The jig for electrolytic polymerization according to any one of [12] or [14] above, comprising a power supply circuit capable of changing the amount of a current within a range of from 5 to 200 µA.

[16] The jig for electrolytic polymerization according to any one of [12] to [15] above, a number of the plurality of power supply circuits is 10 to 330.

[17] The jig for electrolytic polymerization according to any one of [12] to [16] above, in which: each of the power supply circuits has heating parts; the heating parts are disposed on both front and back side of the insulating substrate; and the same type of the heating part as the heating part disposed on the front side of the insulating substrate is disposed on a back side thereof corresponding to a position of the heating part disposed on the front side thereof.

[18] The jig for electrolytic polymerization according to [17] above, in which the heating parts are each a transistor or a resistor.

[19] The jig for electrolytic polymerization according to [17] or [18] above, in which the power supply circuits are each constituted by a discrete circuit.

[20] The jig for electrolytic polymerization according to any one of [12] to [19] above, in which each of the power supply circuits is a circuit including a PNP transistor, in which an emitter of the transistor is electrically connected to a terminal for setting a maximum current value via a resistor, a base of the PNP transistor is electrically connected to a terminal for setting a maximum voltage value, and a collector of the transistor serves as an output.

Effects of the Invention

The present invention makes it possible to continuously change the current of the jig for electrolytic polymerization to an arbitrary value and to apply the current to a conductor layer, which enables an optimum electrolytic polymerization as the polymerization proceeds. Accordingly, a high impregnation rate can be attained even when using anode bodies which have fine pores or which are large in volume and comprise distant parts from the outer surface, and a group of capacitor elements having high humidity resistance (particularly having a low capacitance change rate) can be obtained.

MODE FOR CARRYING OUT THE INVENTION

A detailed description is given below on a method of manufacturing a capacitor element, in which a semiconductor layer is formed on a dielectric layer formed on a plurality of anode bodies at one time, and a jig for manufacturing a capacitor element (jig for electrolytic polymerization) of the present invention.

[Anode Body]

Examples of the anode body used in the present invention include metal, an inorganic semiconductor, an organic semiconductor, carbon, a mixture of at least one kind thereof, and a laminate obtained by laminating an electrical conductor on the surface layer thereof. Among these anode bodies, a valve metal or a conductive oxide of a valve metal is preferred because a dielectric layer can be formed by subjecting the anode body itself to chemical conversion treatment, and further an anode body having pores is preferred because a dielectric layer having a large surface area can be obtained. Examples of such anode bodies include a sintered body of tantalum, niobium, niobium monoxide and titanium. Further, the anode body is preferred to have lead wires, a part of which is embedded in the anode body.

The present invention is particularly effective on an anode body, which is a sintered body in which a CV value per volume excluding voids is 1,600,000 µF·V/cm$^3$ or more (corresponding to a CV value of about 100,000 µF·V/g or more per unit mass in a tantalum sintered body and a CV value of about 194,000 µF·V/g or more per unit mass in a niobium sintered body); or a sintered body having the volume of 20 mm$^3$ or more in which a CV value per volume excluding voids is 800,000 µF·V/cm$^3$ or more (corresponding to a CV value of about 50,000 µF·V/g or more per unit mass in a tantalum sintered body and a CV value of about 97,000 µF·V/g or more per unit mass in a niobium sintered body). Unless otherwise noted, the volume of a sintered body is the volume determined by the outer dimensions of the sintered body, including the volume of voids inside the sintered body. While the upper limit of the CV value generally varies depending on materials of the sintered body and the chemical conversion voltage, the present invention can be applied to the full extent of the upper limit.

Here, the CV value (µF·V/g) per unit mass of the sintered body is defined as a value calculated by dividing the product of the capacitance of a sintered body having a void ratio of 61% (corresponding to a sintered body having a density of about 6.5 g/cm$^3$ in the case of a tantalum sintered body and a sintered body having a density of about 3.3 g/cm$^3$ in the case of a niobium sintered body), which is obtained by chemical conversion in an aqueous solution of 0.5 mass % phosphoric acid at 65° C. and 10 V for three hours and subsequent washing with water and drying, measured in an aqueous solution of 30 mass % sulfuric acid at room temperature and wavelength of 120 Hz (for example, by an LCR meter manufactured by Agilent Technologies Japan, Ltd.) and the chemical conversion voltage of 10 V by the mass of the sintered body.

[Forming of Dielectric Layer]

Figure 1:
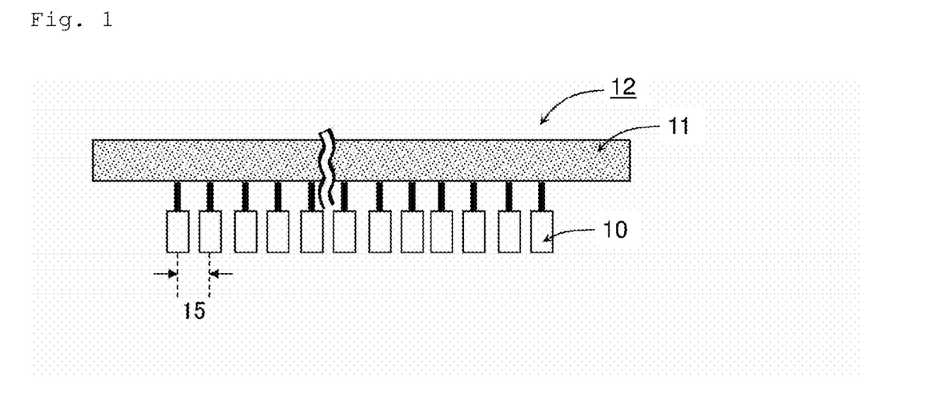
FIG. 1 is a schematic view of a support substrate made of an elongated conductive material from which a plurality of sintered bodies are vertically suspended.

In the present invention, an anodic body having a dielectric layer formed on its surface is used. From the viewpoint of ease in industrial handling, it is desirable to form a dielectric layer on the surface of the anode body by chemical conversion treatment prior to the formation of a semiconductor layer by electrolytic polymerization. For example, the formation of a dielectric layer is conducted by aligning multiple support substrates (11) made of an elongated conductive material (such as a metal plate) (hereinafter may be referred to as a support substrate of anode bodies (12)), from which a plurality of the above-mentioned bodies (10) are vertically suspended with equal spacing and connected by welding at the lead wire, in parallel to each other in a metal frame; immersing the anode bodies (or a part of the lead wire thereof and anode bodies) in a chemical solution in a chemical conversion tank prepared separately; applying a current between the metal frame serving as an anode and the cathode plate in the chemical conversion tank for a predetermined time; and pulling the anode bodies out of the chemical solution followed by washing and drying.

[Forming of Semiconductor Layer]

Generally, a semiconductor layer, which is the other electrode of a solid electrolytic capacitor, can be constituted by an inorganic semiconductor such as manganese dioxide or an organic semiconductor such as a conductive polymer doped with a dopant. In the present invention, in order to obtain in particular a low equivalent series resistance (ESR), a conductive polymer layer is formed by carrying out polymerization on the anode bodies having the dielectric layer, and the conductive polymer layer is used as a semiconductor layer.

The above-mentioned polymerization can be carried out by a chemical polymerization method, an electropolymerization method by bringing an external electrode (power-feeding terminal) into contact with anode bodies, or a combination thereof. Among these, in the electropolymerization, by carrying out the electropolymerization by limiting energizing currents for individual power-feeding terminals having the dielectric layer formed thereon to control the reaction rate of the electropolymerization, a stable conductive polymer layer with good reproducibility can be formed.

In particular, when electropolymerization is carried out, it is preferred to carry out polymerization with a low current at an initial stage of electropolymerization and thereafter carry out polymerization with an increased current amount. The current amount may be increased in stages or continuously. Also, prior to the electropolymerization, a semiconductor layer not by electropolymerization may be formed on the surface of the dielectric layer provided on the anode bodies. It is desirable to form a chemical polymerization product (semiconductor layer) in advance on the dielectric layer by, for example, repeating an operation of immersion in a solution containing a material monomer used to make a semiconductor; an operation of immersion in a solution containing a dopant (such as aryl sulfonate); and an operation of heating to 80 to 150° C.; since it eliminates the need to specially limit the amount of current at an initial stage of the above-mentioned electropolymerization.

While the amount of current in the above-mentioned electropolymerization varies depending on the material used as the semiconductor layer, it is generally within a range of 5 to 200 µA per power-feeding terminal. As a measure for setting the current amount, for example, the lower limit of the current amount in the case where a constant current is provided may be set at such a current amount that pores of the anode bodies are not closed before a semiconductor layer is formed on the surfaces of pores at the initial stage of electropolymerization, that is, a current amount in a range in which the capacitance appearance ratio is not reduced. Further, the upper limit of the current amount may be increased to such an extent that the semiconductor layer does not show abnormal growth on the outer surfaces of the anode bodies, that is, to a current amount satisfying allowable dimension accuracy of the outer surfaces.

When the electropolymerization is carried out by setting the upper limit and the lower limit of current amount within the above-mentioned range and repeating the increase and decrease of the current amount within the upper and lower limits in a short period of time, a low ESR capacitor element having a high capacitance appearance ratio can be obtained. To facilitate obtaining such an effect, it is desirable to increase and decrease the current amount between the lower and upper limits preferably within a period of 30 seconds to 30 minutes, more preferably within a period of 40 seconds to 5 minutes and still more preferably within a period of one to three minutes. Also, it is preferable to configure the polymerization method so that the current amount increases and decreases continuously or in stages at a constant rate.

A capacity appearance rate (also referred to as "impregnation rate)" is a percentage determined from the capacitance of the anode bodies having a dielectric layer formed thereon and before the formation of a semiconductor layer, measured in an aqueous solution of 30 mass % sulfuric acid at room temperature and wavelength of 120 Hz as a denominator; and the capacitance of solid electrolytic capacitor elements, in which a semiconductor layer is formed on the above anode bodies and a carbon layer and a silver paste layer are sequentially stacked on the semiconductor layer and dry-cured, measured at room temperature and wavelength of 120 Hz as a numerator.

[Jig for Electropolymerization and Support Substrate of Anode Bodies]

The jig for manufacturing a capacitor (jig for electropolymerization) according to the present invention includes: a plurality of (the number corresponding to power-feeding terminals) power supply circuits provided on an insulating substrate, which are capable of setting each of a voltage limit value and a current limit value; connection terminals for the anode bodies (hereinafter, may be referred to as power-feeding terminals to anode bodies), which are electrically connected to respective outputs of the plurality of power supply circuits; and a terminal for setting the voltage limit value (hereinafter, may be referred to as voltage limiting terminal) and a terminal for setting the current limit value (hereinafter, maybe referred to as current limiting terminal) with respect to the plurality of power supply circuits.

Any power-feeding terminals will do as long as they can supply power to anode bodies by being in contact with the anode bodies suspended from the above-mentioned support substrate of anode bodies at the time of electropolymerization. For example, terminals having a linear shape can be used and particularly terminals having a blunt tip are preferable so that the anode bodies will not be damaged.

Hereinafter, an example of the jig for manufacturing a capacitor according to the present invention is described with reference to FIG. 2 and FIG. 3, but the present invention is not limited to the example.

Figure 2:
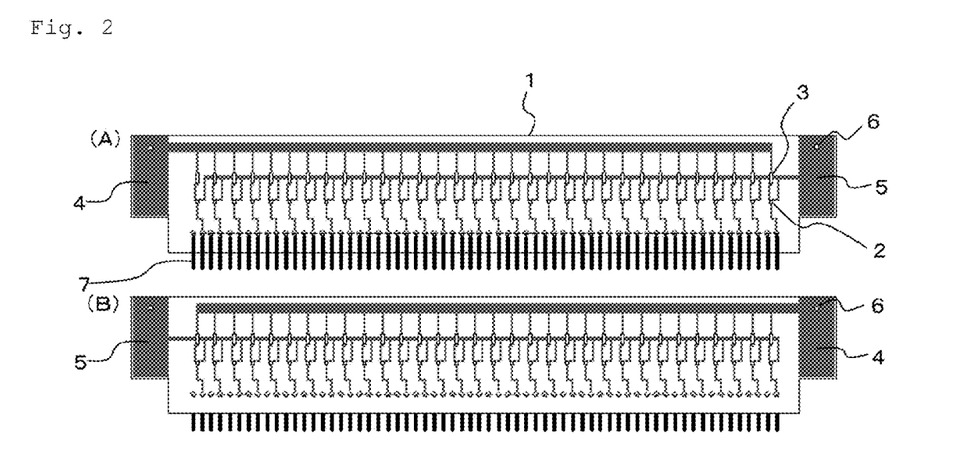
FIGS. 2(A) and 2(B) are respectively the front and back views of an example of a jig for electrolytic polymerization for forming a semiconductor layer of capacitor elements of the present invention.
Figure 3:
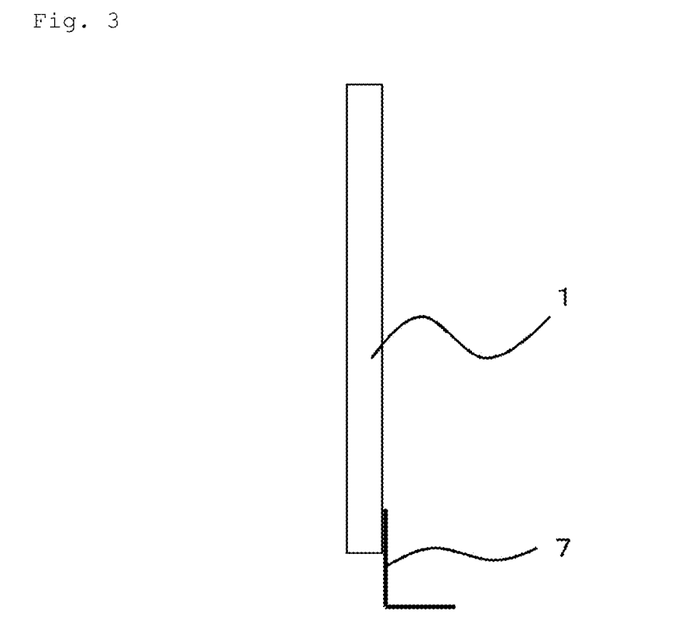
FIG. 3 is an enlarged view showing a lateral side of the power-feeding terminal for applying a current to anode bodies of the jig for electrolytic polymerization of FIG. 2.

FIG. 2 are a front view (A) and a back view (B) of the example of the jig for electropolymerization. In a jig (1) for electropolymerization, 64 pairs (32 pairs each on front and back side) of power supply circuits each formed of a transistor (2) and a resistor (3) are disposed on both sides of a horizontally-long insulating substrate. The jig further includes terminals at both ends thereof, one of which is a current limiting terminal (4) while the other is a voltage limiting terminal (5).

The front and back current limiting terminals (4) and the front and back voltage limiting terminals (5) are electrically connected to each other, respectively, via through-holes (6).

In FIG. 2, reference numeral (7) represents a power-feeding terminal to be in contact with a plurality of anode bodies which are vertically-suspended from and connected to the support substrate for anode bodies in FIG. 1 at the time of electropolymerization. As in an enlarged view of the lateral side shown in FIG. 3, conductive member having a linear shape (7) is fixed by soldering and the like to the end of the substrate (1), which is electrically connected to the above-mentioned power supply circuit, and extend downward in a vertical direction; and the tip thereof (power-feeding terminal portions for anode bodies) is bent at an about 90-degree angle to the substrate surface. At the time of electropolymerization, the jig for electropolymerization is brought close to the support substrate for anode bodies to bring the connecting terminal portion of the conductive member having a linear shape (7) into contact with the anode bodies to apply current. The shape of the power-feeding terminals for anode bodies can be changed as appropriate depending on the shape of the anode bodies.

Figure 4:
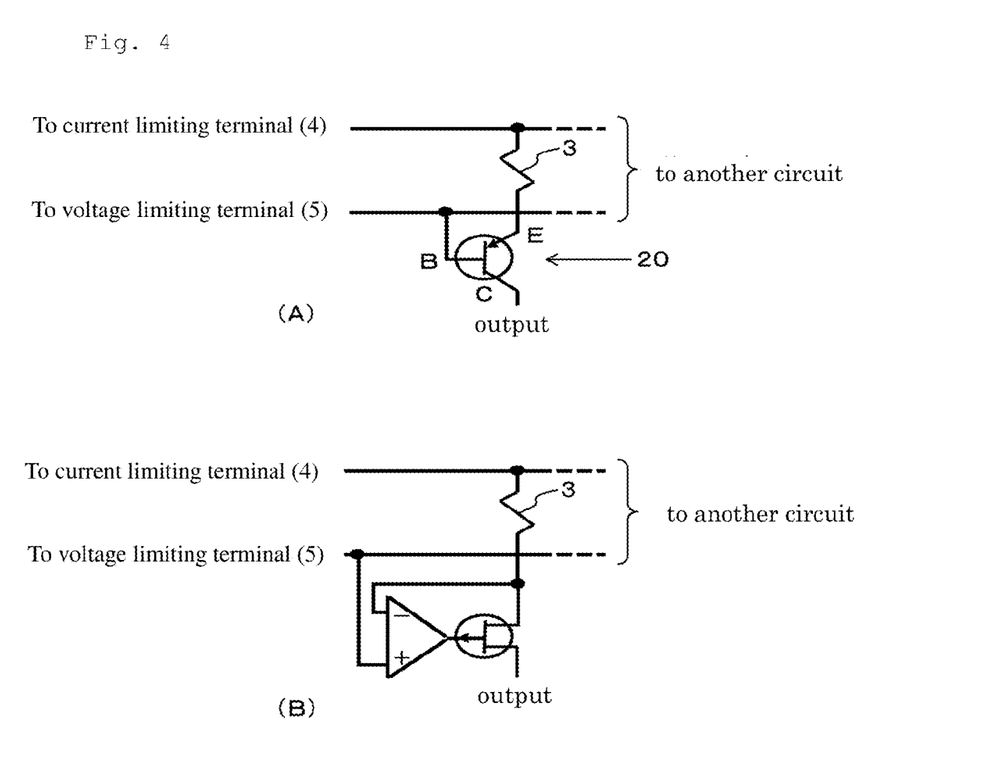
FIGS. 4(A) and 4(B) are each an example of a power supply circuit of the jig for electrolytic polymerization of the present invention.

FIG. 4 illustrate examples of the individual power supply circuits used in the jig for manufacturing a capacitor of FIG. 2. FIG. 4(A) illustrates a circuit including a PNP transistor (20), in which an emitter (E) of the transistor is electrically connected to the current limiting terminal (4) via the resistor (3), a base (B) of the transistor is electrically connected to the voltage limiting terminal (5), and a collector (C) of the transistor serves as an output.

Figure 5:
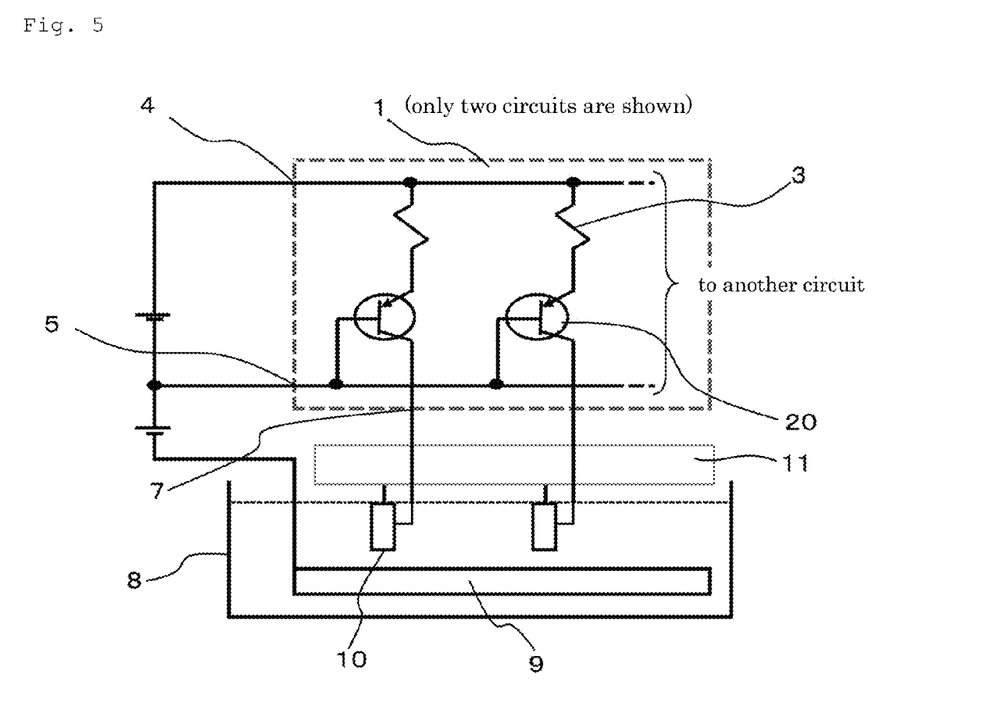
FIG. 5 is a connection example between the power supply circuits of FIG. 4(A) and the jig for electrolytic polymerization of the present invention.

The power supply circuits of FIG. 4(A) and the jig for manufacturing a capacitor of FIG. 2 are connected as illustrated in FIG. 5.

Based on a voltage to be applied between the voltage limiting terminal (5) and a cathode plate (9) in an electropolymerization bath (8), a limit value of a maximum voltage to be applied to the power-feeding terminal (7) can be set. The voltage applied between the voltage limiting terminal (5) and the cathode plate (9) in the polymerization bath (8) substantially equals to the maximum voltage applied to the power-feeding terminal (7).

While one power-feeding terminal is assigned to one anode body, two or more power-feeding terminals may be assigned to one anode body, if it is physically possible, which can complete the polymerization in a shorter time. Multiple power-feeding terminals to be connected to one anode body may be power-feeding terminals of different jigs for manufacturing a capacitor.

Further, based on a voltage to be applied between the current limiting terminal (4) and the voltage limiting terminal (5), a limit value of a maximum current which can be supplied to the power-feeding terminal (7) can be set.

The limit value of the maximum current is substantially expressed by the following expression based on the voltage applied between the current limiting terminal (4) and the voltage limiting terminal (5), a base-emitter voltage (Vbe) of the transistor, and a resistance of the resistor.

limit value of maximum current=(voltage applied between current limiting terminal and voltage limiting terminal−$Vbe$)/resistance of resistor    [Math. 1]

Generally, Vbe (base-emitter voltage of transistor) is approximately 0.5 to 0.8 V.

The circuit to be used in the jig for manufacturing a capacitor according to the present invention is not limited to the one illustrated in FIG. 4(A). For example, a circuit having a similar function to that of the circuit illustrated in FIG. 4(B) can be used, in which the limit value of the maximum current is proportional to the voltage applied between the current limiting terminal and the voltage limiting terminal.

By changing the voltage applied to the voltage limiting terminal or the current limiting terminal as described above, the voltage limit value or the current limit value can be changed even during the forming of the semiconductor layer. Further, by changing the voltage applied to the voltage limiting terminal or the current limiting terminal continuously, the voltage limit value or the current limit value can be changed continuously.

In order to obtain a homogeneous semiconductor layer having a small capacitance and ESR deviation by using the jig for electropolymerization according to the present invention, it is preferred to reduce the current deviation in a lower current region similarly to the above. In other words, under the state in which the output currents of all the power supply circuits are limited, when the average value of the output currents of the power supply circuits is 5 to 200 μA, the output currents of the individual circuits are set preferably within a range of from 90% at minimum to 110% at maximum of the average value, more preferably within a range of from 95% at minimum to 105% at maximum of the average value.

In the cases of the circuits of FIGS. 4(A) and 4(B), the above-mentioned current amount deviation can be suppressed by using a resistor with a small error (e.g., with error of 1%).

In the case of manufacturing a capacitor in this way, the capacitances of the individual capacitor elements of a capacitor element group composed of 300 or more capacitor elements manufactured at the same time can be kept within the range of from 90 to 110% of an average value of the capacitances of the 300 or more capacitor elements.

Further, also in an electrolytic capacitor group including electrolytic capacitors constituted by one or a plurality of capacitor elements of the above-mentioned capacitor element group, capacitors having good accuracy and no capacitance fluctuation can be obtained similarly to the above.

In the jig for electropolymerization according to the present invention, as the width (length in longitudinal direction of the jig (1) for electropolymerization in FIG. 2) of the insulating substrate is longer (accordingly, as the length in longitudinal direction of the corresponding support substrate for anode bodies (12) in FIG. 1 is longer), a larger number of elements can be processed by a single jig.

On the other hand, in order to maintain high dimension accuracy of the jig, the width of the insulating substrate and the width of the support substrate for anode bodies) are desired to be shorter. In particular, if the jig has a small warp (distortion in the front-back direction of the sheet of FIG. 2), in the case where a plurality of jigs and support substrates for anode bodies are placed side by side in a polymerization bath having a certain size, even when the jigs and the support substrates for anode bodies are placed closer to one another, constant intervals between the power-feeding terminal of the jig and the anode bodies of the support substrate can be maintained, which results in the increase in the yield.

In the case where a glass epoxy substrate, which is easily available, is used as the material of the jig, the width is preferably 10 to 50 cm, more preferably 20 to 40 cm.

Further, the distance between adjacent power-feeding terminals to anode bodies may be adjusted to match the interval (pitch) of the anode bodies connected to the support for anode bodies. The interval between anode bodies only needs to be larger than the width of the anode body to be connected.

However, it is preferred to increase the interval to such an extent that no liquid bridge is formed when the anode bodies are pulled up out of the process liquid because the step of removing the liquid bridge can be omitted. The width of the anode body is generally about 1 mm to about 10 mm, and hence it is preferred to set the distance between the anode bodies to 1.25 to 12 mm. The distance between the power-feeding terminals adjacent to the anode bodies also becomes the same as described above.

Considering the jig width and the distance between the power-feeding terminals to anode bodies described above, it is preferred to set the number of the power supply circuits per jig for electropolymerization according to the present invention to 10 to 330.

When the number of the power supply circuits is large or when a high current is supplied, heat is liable to be generated by the parts used in the power supply circuits. If the insulating substrate is non-uniformly heated by the generated heat, distortion may occur in the insulating substrate due to a partial difference in thermal expansion. In particular, warp is liable to occur due to the difference in temperature of the front and back side of the substrate.

In light of the above, in the case where the warp of the insulating substrate is to be prevented to obtain high dimension accuracy, it is preferred to dispose heating parts so as to reduce the difference in temperature of the front and back side of the substrate. To achieve this, for example, the heating parts may be disposed on both of the front and back sides of the insulating substrate such that the same type of the heating part as the heating part disposed on the front side of the insulating substrate is disposed on a back side thereof corresponding to a position of the heating part disposed on the front side thereof.

Generally, the heating part is a part which may possibly consume the most (50% or higher) of electric power consumed by the power supply circuit. The heating parts in the circuit of FIG. 2(A) are the transistor and the resistor.

Further, it is preferred that the heating parts be disposed on the substrate in a dispersed manner as much as possible in order that only a part of the jig for electropolymerization be not at high temperature. In order to dispose the heating parts in a dispersed manner, it is preferred to use a discrete circuit as the power supply circuit.

[Capacitor Element and Capacitor]

The resultant obtained by the above-mentioned method, in which the dielectric layer and the semiconductor layer are sequentially formed on the anode bodies, may be completed as a capacitor element without any further process. However, preferably, an electrical conductor layer is formed on the semiconductor layer in order to obtain good electrical connection to an external lead-out wire (e.g., lead frame) of the capacitor, and the resultant is completed as a capacitor element. For example, as the electrical conductor layer, a carbon layer and a silver layer are sequentially laminated on the semiconductor layer, to thereby obtain a capacitor element.

An anode of one or a plurality of the capacitor elements is electrically connected to the anode terminal, and the electrical conductor layer is electrically connected to the cathode terminal, followed by jacketing the capacitor elements with a resin, to thereby obtain an electrolytic capacitor.

EXAMPLES

Hereinafter, the present invention is specifically described by way of examples and comparative examples. However, the present invention is not intended to be limited by the following examples.

Examples 1 to 3 and Comparative Examples 1 to 4

A niobium powder having a CV value of 150,000 µF·V/g and the nitrided amount of 8,600 ppm was obtained by pulverization of a niobium ingot after the hydrogen absorption, dehydrogenating and granulating the pulverized ingot. The obtained niobium powder was shaped together with a niobiumwire of 0.29 mmφ, followed by sintering in vacuum at 1,280° C. for 30 minutes, to thereby produce a sintered body (anode body) having the dimensions of 1.5×3.0×4.5 mm (volume of 20.25 mm$^3$) to obtain 640 niobium sintered body having a density of about 3.3 g/cm$^3$ to be made into anode bodies. Note that, the niobium lead wire is implanted in the center of a face of 1.5×3.0 mm so as to be embedded inside the sintered body by 3.7 mm and be extended out of the outer surface by 4.3 mm.

A separately prepared tetrafluoroethylene polymer washer having an outer diameter of 2 mm, an inner diameter of 0.26 mm, and a thickness of 0.2 mm is inserted to each of the lead wires at the position 0.2 mm away from the sintered body.

Next, the ends of the lead wires of 64 sintered bodies (10) were welded to an elongated metal plate (11) made of stainless-steel (SUS 304) having the dimensions of 214×20 mm and the thickness of 2 mm at intervals of 3 mm (15) as shown in FIG. 1. The sintered bodies were placed so that the face of 1.5×4.5 mm of a sintered body becomes parallel to the plane of the elongated metal plate.

Ten of such elongated metal plates (11) on which sintered bodies are placed were prepared and 640 sintered bodies in total were subjected to the treatment set forth below.

[Formation of a Dielectric Layer]

The sintered bodies were immersed in a container of a 0.5 mass % phosphoric acid aqueous solution so that the washer portions provided on the lead wires of the sintered bodies reach the liquid level. After the sintered bodies were subjected to chemical conversion treatment at 65° C. and 10 V for three hours, they were washed with water and dried. Subsequently, the sintered bodies being connected to the elongated metal plate was placed in a surface at 250° C. and left to stand for 45 minutes. After cooled to room temperature, the sintered bodies were subjected to chemical conversion treatment under the same conditions as described above. A dielectric layer was formed on the surface of a sintered body by these operations.

[Formation of a Semiconductor Layer]

Next, sintered bodies having formed a dielectric layer thereon and being connected to an elongated metal plate were immersed in an ethanol solution of 2 mass % ethylenedioxythiophene and then in a 1 mass % iron xylenesulfonate aqueous solution, and placed in a furnace at 115° C., thereby allowing them to react. The steps of immersing in an ethanol solution of 2 mass % ethylenedioxythiophene to the reaction were repeated another five times (six times in total) to thereby allow a chemical polymerization product on a dielectric layer of the sintered body.

1) Jig for Electropolymerization

Ten jigs for electropolymerization (1) illustrated in FIG. 2 were prepared. The jig is a copper-clad glass epoxy substrate having the dimensions of 194.0×33.0 mm and the thickness of 1.6 mm, in which notch portions of 8×10 mm each are provided in both sides in its longitudinal direction, and two terminal portions serving as electrodes are provided at 8×23 mm portions above the notches (one is the current limiting terminal (4) and the other is the voltage limiting terminal (5)). The terminal portions at the two right and left positions are electrically connected to terminal portions having the same areas provided on the back surface via the through-holes (6) provided at the terminal portions, respectively. There are fixed 32 pairs each in front and back side of the substrate, in total 64 pairs, of the resistors (3) of 20 kΩ (within error of 0.1%) and the transistors 2SA2154GR (2), and 64 copper wires 0.45 mm in diameter on one surface (front surface) by soldering. The copper wires are extended vertically downward from the end of the substrate, bent at a 90-degree angle to the substrate surface at a point 5 mm below the substrate, and extended by another 5 mm (see FIG. 3). The tips of the copper wires are processed into a semispherical form. The copper wires are with gold flash-plating over a nickel underlayer within a range of 3 mm from the tip.

2) Electropolymerization

The above-mentioned sintered bodies having a dielectric layer thereon and being connected to an elongated metal plate were immersed in a 10% by mass ethylenedioxythiophene ethanol solution (hereinafter referred to as monomer impregnation), pulled out of the chemical solution, washed and dried in air, and only the ethanol component was removed. Then the sintered bodies were placed in an electropolymerization solution comprising 1 mass % ethylenedioxythiophene, 2 mass % anthraquinone sulfonic acid, 30 mass % ethylene glycol and 67 mass % distilled water so that the washer of the sintered bodies reach the liquid level. Further, ten of the above-mentioned jigs for electropolymerization were placed in parallel to ten of these elongated metal plates to which sintered bodies were connected and horizontally moved to the side of the elongated metal plates so that the tip portions of the gold plating on the copper wires slightly touch the surface of the sintered bodies. A current was supplied to the copper wire in this condition (electropolymerization). The amount and time of the current supplied are shown in Table 1. Also, the maximum voltage to be applied to the copper wire at this stage was set to 5 V. Further, the operation taking place from the monomer impregnation to the electropolymerization was repeated as many times as in Table 1.

Next, capacitor elements were produced by conducting chemical conversion treatment under the same conditions as mentioned above except that the voltage to be applied was set to 6V; washing the sintered bodies subjected to chemical conversion treatment with water followed by drying; and laminating a carbon paste layer and a silver paste layer sequentially on the sides of the sintered bodies except for the side in which a lead wire is implanted. Among the obtained 640 capacitor elements, the capacitance was measured with respect to about 630 capacitor elements except for several ones having an abnormality (such as short circuiting) to thereby determine the impregnation rate. The results are shown in Table 1.

Next, the capacitor element was placed on the lead frame. Then, an anode lead of the capacitor element was connected to the anode terminal of the lead frame, and the electrical conductor layer of the capacitor element was connected to the cathode terminal of the lead frame. Then, transfer sealing and aging were carried out to produce 640 niobium solid electrolytic capacitors each having the dimensions of 3.5×2.8×1.8 mm, a rating of 2.5 V, and a capacitance of 330 μF. An average capacitance and the range of upper and lower limit values of the capacitance of the 600 capacitors are shown in Table 5.

TABLE 1

|  | Electropolymerization | Repetition times | Impregnation rate (%) |
| --- | --- | --- | --- |
| Example 1 | Constant current was applied for 5 seconds in each stage. The current was decreased from 120 μA to 5 μA by every 5 μA and then increased from 5 μA to 120 μA, and the step was repeated another 39 times (40 times in total). | 5 | 86 |
| Example 2 | Constant current was applied for 2 seconds in each stage. The current was decreased from 100 μA to 5 μA by every 1 μA and then increased from 5 μA to 100 μA, and the step was repeated another 29 times (30 times in total). | 6 | 92 |
| Example 3 | Constant current was applied for 10 seconds in each stage. The current was increased from 10 μA to 130 μA by every 8 μA and then decreased from 130 μA to 10 μA, and the step was repeated another 19 times (20 times in total). | 7 | 90 |
| Comparative Example 1 | Current of 60 μA was applied for 4,800 seconds | 6 | 54 |
| Comparative Example 2 | Current of 120 μA was applied for 4,800 seconds | 6 | The surface of the semiconductor layer was peeled off |
| Comparative Example 3 | Current of 120 μA was applied for 4,800 seconds | 5 | 58 |
| Comparative Example 4 | The same as in Example 3 except that the energization was stopped temporarily (for about 10 ms) when changing the current value. | 7 | 65 |

Examples 4 to 5 and Comparative Examples 5 to 6

A niobium powder having a CV value of 220,000 μF·V/g and the nitrided amount of 15,000 ppm was obtained in the same way as in Example 1 by adjusting the pulverization time and the nitridation treatment time to produce sintered bodies. Capacitor elements were produced using the niobium sintered bodies (sintered bodies having the dimensions of 1.0× 2.4×3.4 mm (volume of 8.16 mm$^3$) having a lead wire implanted in the face of 1.0×2.4 mm) in the same way as in Example 1 except for setting the electropolymerization conditions to the values shown in Table 2. The capacitance of the obtained capacitor elements was measured to determine the impregnation rate. The results are shown in Table 2. An average capacitance and the range of upper and lower limit values of the capacitance of the capacitors produced in the same way as in Example 1 are shown in Table 5.

TABLE 2

|  | Electropolymerization | Repetition times | Impregnation rate (%) |
|---|---|---|---|
| Example 4 | The current was increased from 20 μA to 100 μA by every 20 μA at 60 second intervals, the current was returned to 20 μA and the step was repeated for another 9 times (10 times in total); The current was increased from 30 μA to 110 μA by every 20 μA at 60 second intervals, the current was returned to 30 μA and the step was repeated for another 9 times (10 times in total); The current was increased from 40 μA to 100 μA by every 10 μA at 120 second intervals, the current was returned to 40 μA and the step was repeated for another 9 times (10 times in total); and The current was increased from 20 μA to 100 μA by every 20 μA at 60 second intervals, the current was returned to 20 μA and the step was repeated for another 39 times (40 times in total). | 5 | 91 |
| Example 5 | The current was increased from 10 μA to 100 μA by every 10 μA at 30 second intervals, the current was returned to 10 μA and the step was repeated for another 19 times (20 times in total); The current was increased from 30 μA to 110 μA by every 20 μA at 60 second intervals, the current was returned to 30 μA and the step was repeated for another 9 times (10 times in total); The current was increased from 50 μA to 100 μA by every 10 μA at 150 second intervals, the current was returned to 50 μA and the step was repeated for another 9 times (10 times in total); and The current was increased from 10 μA to 100 μA by every 10 μA at 60 second intervals, the current was returned to 10 μA and the step was repeated for another 14 times (15 times in total). | 5 | 92 |
| Comparative Example 5 | Current of 60 μA was applied for 26,400 seconds | 5 | 60 |
| Comparative Example 6 | Current of 80 μA was applied for 27,000 seconds | 5 | 66 |

Examples 6 to 7 and Comparative Examples 7 to 8

Commercially available tantalum powder having a CV value of 70,000 μF·V/g was used instead of the niobium powder in Example 1. The tantalum powder was sintered in vacuum at 1,400° C. for 30 minutes to obtain sintered bodies having a density of 6.5 g/cm³ and the dimensions of 2.5×3.8×7.2 mm (volume of 68.4 mm³). A tantalum lead wire of 0.40 mm ϕ is implanted in the face of 2.5×3.8 mm of the sintered body. Capacitor elements were produced using the sintered bodies in the same way as in Example 1 except for setting the electropolymerization conditions to the values shown in Table 3. The capacitance of the obtained capacitor elements was measured to determine the impregnation rate. The results are shown in Table 3. An average capacitance and the range of upper and lower limit values of the capacitance of the capacitors produced in the same way as in Example 1 are shown in Table 5.

TABLE 3

|  | Electropolymerization | Repetition times | Impregnation rate (%) |
|---|---|---|---|
| Example 6 | The current was decreased from 120 μA to 5 μA by every 5 μA at 5 second intervals, the current was returned to 120 μA and the step was repeated for another 59 times (60 times in total); the current was decreased from 140 μA to 5 μA by every 10 μA at 20 second intervals, the current was returned to 140 μA and the step was repeated for another 79 times (80 times in total); and the current was increased from 40 μA to 100 μA by every 10 μA at 120 second intervals, the current was returned to 40 μA and the step was repeated for another 9 times (10 times in total). | 5 | 88 |
| Example 7 | The current was decreased from 100 μA to 5 μA by every 1 μA at 2 second intervals, the current was returned to 100 μA and the step was repeated for another 59 times (60 times in total); the current was increased from 10 μA to 130 μA by every 8 μA at 10 second intervals, the current was returned to 10 μA and the step was repeated for another 69 times (70 times in total); the current of 100 μA was applied for 800 seconds | 5 | 91 |

TABLE 3-continued

|  | Electropolymerization | Repetition times | Impregnation rate (%) |
|---|---|---|---|
|  | for one time; and the current was increased from 40 μA to 80 μA by every 10 μA at 140 second intervals, the current was returned to 40 μA and the step was repeated for another 9 times (10 times in total). |  |  |
| Comparative Example 7 | Current of 60 μA was applied for 26,000 seconds | 5 | 64 |
| Comparative Example 8 | Current of 75 μA was applied for 30,000 seconds | 5 | 66 |

Examples 8 to 9 and Comparative Examples 9 to 10

Commercially available tantalum powder having a CV value of 150,000 μF·V/g was used in Example 6. The tantalum powder was sintered in vacuum at 1,320° C. for 30 minutes to obtain sintered bodies having a density of 6.5 g/cm$^3$ and the dimensions of 1.1×3.0×4.0 mm (volume of 13.2 mm$^3$). Capacitor elements were produced using the sintered bodies in the same way as in Example 1 except for setting the electropolymerization conditions to the values shown in Table 4. The capacitance of the obtained capacitor elements was measured to determine the impregnation rate. The results are shown in Table 4. An average capacitance and the range of upper and lower limit values of the capacitance of the capacitors produced in the same way as in Example 1 are shown in Table 5.

TABLE 4

|  | Electropolymerization | Repetition times | Impregnation rate (%) |
|---|---|---|---|
| Example 8 | The current was increased from 20 μA to 100 μA by every 20 μA at 30 second intervals, the current was returned to 20 μA and the step was repeated for another 79 times (80 times in total); the current was increased from 30 μA to 110 μA by every 20 μA at 30 second intervals, the current was returned to 30 μA and the step was repeated for another 79 times (80 times in total); and the current was increased from 40 μA to 100 μA by every 10 μA at 120 second intervals, the current was returned to 40 μA and the step was repeated for another 9 times (10 times in total); and the current of 120 μA was applied for 600 seconds for one time. | 5 | 87 |
| Example 9 | The current was increased from 10 μA to 100 μA by every 10 μA at 30 second intervals, the current was returned to 10 μA and the step was repeated for another 49 times (50 times in total); the current was increased from 30 μA to 110 μA by every 20 μA at 20 second intervals, the current was returned to 30 μA and the step was repeated for another 99 times (100 times in total); the current was increased from 50 μA to 100 μA by every 10 μA at 150 second intervals, the current was returned to 50 μA and the step was repeated for another 9 times (10 times in total); the current was increased from 10 μA to 100 μA by every 10 μA at 10 second intervals, the current was returned to 10 μA and the step was repeated for another 14 times (15 times in total); and the current of 120 μA was applied for 600 seconds for one time. | 5 | 90 |
| Comparative Example 9 | Current of 60 μA was applied for 33,000 seconds | 5 | 60 |
| Comparative Example 10 | Current of 75 μA was applied for 36,000 seconds | 5 | 62 |

TABLE 5

| | Capacitance Distribution (μF) |
|---|---|
| Example 1 | 851 ± 22 |
| Example 2 | 911 ± 18 |
| Example 3 | 891 ± 36 |
| Example 4 | 539 ± 19 |
| Example 5 | 545 ± 16 |
| Example 6 | 2739 ± 256 |
| Example 7 | 2832 ± 228 |
| Example 8 | 1119 ± 205 |
| Example 9 | 1158 ± 188 |
| Comparative Ex. 1 | 535 ± 74 |
| Comparative Ex. 2 | — |
| Comparative Ex. 3 | 574 ± 81 |
| Comparative Ex. 4 | 644 ± 68 |
| Comparative Ex. 5 | 355 ± 70 |
| Comparative Ex. 6 | 391 ± 64 |
| Comparative Ex. 7 | 1992 ± 386 |
| Comparative Ex. 8 | 2054 ± 350 |
| Comparative Ex. 9 | 772 ± 279 |
| Comparative Ex. 10 | 798 ± 269 |

Test Example: Humidity Resistance Test

The chip capacitors were obtained by connecting the capacitor elements in each of the above-described examples to a lead frame and by conducting transfer sealing and aging according to a known method. 60 of the capacitors were selected and subjected to the humidity resistance test. The conditions are set to 60° C., 90% RH (relative humidity) for 500 hours with no load. While the capacitance change rate after 500 hours was +7% or less in the capacitors of all the Examples, the rate exceeded +21% in the capacitors of all the Comparative Examples.

REFERENCE SIGNS LIST

1 jig for electropolylmerization
2 transistor
3 resistor
4 current limiting terminal
5 voltage limiting terminal
6 through-hole
7 power-feeding terminal (a conductive member having a linear shape)
8 electropolymerization bath
9 cathode plate
10 anode body (sintered body)
11 support substrate (elongated metal plate)
12 support substrate for anode bodies
15 pitch
20 PNP transistor
B base of transistor
E emitter of transistor
C collector of transistor

The invention claimed is:

1. A method of manufacturing a solid electrolytic capacitor element comprising the steps of forming a semiconductor layer on the dielectric layer formed on surfaces of a plurality of anode bodies at one time, wherein a step of forming a semiconductor layer comprises repeating an electrolytic polymerization operation several times by applying a current from a power-feeding terminal that comes into contact with each anode body, and at least one of the electrolytic polymerization operations continuously applies a current while changing the amount of current between the range of 5 to 200 μA per power-feeding terminal.

2. The method of manufacturing a solid electrolytic capacitor element according to claim 1, in which applying a current while changing the amount of current is conducted by reducing a current from the upper limit to the lower limit and returning the current from the lower limit to the upper limit or by increasing a current from the lower limit to the upper limit and returning the current from the upper limit to the lower limit.

3. The method of manufacturing a solid electrolytic capacitor element according to claim 2, in which the increase and decrease of the current between the upper and lower limits is conducted within a time range of from 30 seconds to 30 minutes.

4. The method of manufacturing a solid electrolytic capacitor element according to claim 1, in which a semiconductor layer not by electrolytic polymerization is formed on the surface of the dielectric layer of anode bodies prior to the formation of a semiconductor layer by electrolytic polymerization.

5. The method of manufacturing a solid electrolytic capacitor element according to claim 1, in which electrochemical polymerization for forming a semiconductor layer on a dielectric layer formed on a plurality of anode bodies is conducted by bringing the power-feeding terminal of a jig for electrolytic polymerization, comprising a plurality of power supply circuits (i) provided on an insulating substrate and capable of continuously changing the amount of current between a lower limit and an upper limit; and a power-feeding terminals (ii) electrically connected to the output of each of the plurality of power supply circuits, into contact with a plurality of anode bodies joined to an electroconductive support substrate.

6. The method of manufacturing a solid electrolytic capacitor element according to claim 1, comprising the anode body, which is a sintered body in which a CV value per volume excluding voids is 1,600,000 μF·V/cm3 or more.

7. The method of manufacturing a solid electrolytic capacitor element according to claim 1, comprising the anode body, which is a sintered body in which a CV value per volume excluding voids is 800,000 μF·V/cm3 or more and the volume is 20 mm3 or more.

8. The method of manufacturing a solid electrolytic capacitor element according to claim 1, in which a number of the plurality of anode bodies is equal to or larger than 300.

9. A method of manufacturing a solid electrolytic capacitor, comprising manufacturing a capacitor element by the method described in claim 1; electrically connecting an anode body of one or a plurality of the capacitor elements to an anode terminal and electrically connecting a semiconductor layer to a cathode terminal; and jacketing the capacitor elements with a resin thereafter.

10. A solid electrolytic capacitor element group, comprising 300 or more electrolytic capacitor elements which are obtained by the method according to claim 1, wherein the individual electrolytic capacitor elements each have a capacitance within a range from 90 to 110% of an average value of capacitances of the plurality of capacitor elements.

11. A solid electrolytic capacitor group, comprising electrolytic capacitors each comprising one or a plurality of capacitor elements of the capacitor element group according to claim 10.

12. A jig for electrolytic polymerization for forming a semiconductor layer on the dielectric layer formed on a surface of an anode body, comprising a plurality of power supply circuits (i) provided on an insulating substrate and capable of continuously changing the amount of current between a lower limit and an upper limit; and a power-feeding terminals (ii)

electrically connected to the output of each of the plurality of power supply circuits to be placed in contact with anode bodies.

13. The jig for electrolytic polymerization according to claim 12, in which a power-feeding terminal has a linear shape.

14. The jig for electrolytic polymerization according to claim 12, in which, when an average value of the output currents of the power supply circuits is 5 to 200 μA, the output currents of the individual power supply circuits fall within a range of from 90% at minimum to 110% at maximum of the average value.

15. The jig for electrolytic polymerization according to claim 12, comprising a power supply circuit capable of changing the amount of a current within a range of from 5 to 200 μA.

16. The jig for electrolytic polymerization according to claim 12, a number of the plurality of power supply circuits is 10 to 330.

17. The jig for electrolytic polymerization according to claim 12, in which:

each of the power supply circuits has heating parts; the heating parts are disposed on both front and back side of the insulating substrate; and the same type of the heating part as the heating part disposed on the front side of the insulating substrate is disposed on a back side thereof corresponding to a position of the heating part disposed on the front side thereof.

18. The jig for electrolytic polymerization according to claim 17, in which the heating parts are each a transistor or a resistor.

19. The jig for electrolytic polymerization according to claim 17, in which the power supply circuits are each constituted by a discrete circuit.

20. The jig for electrolytic polymerization according to claim 12, in which each of the power supply circuits is a circuit including a PNP transistor, in which an emitter of the transistor is electrically connected to a terminal for setting a maximum current value via a resistor, a base of the PNP transistor is electrically connected to a terminal for setting a maximum voltage value, and a collector of the transistor serves as an output.

* * * * *